(12) United States Patent
Dagaeff et al.

(10) Patent No.: US 8,925,107 B2
(45) Date of Patent: Dec. 30, 2014

(54) METHOD FOR CONTROLLING ACCESS TO VISUAL MEDIA IN A SOCIAL NETWORK

(75) Inventors: Thierry Dagaeff, L'Isle (CH); Deepak Tewari, Lausanne (CH)

(73) Assignee: Privately Sarl, Lausanne (CH)

( * ) Notice: Subject to any disclaimer, the term of this patent is extended or adjusted under 35 U.S.C. 154(b) by 0 days.

(21) Appl. No.: 13/824,081

(22) PCT Filed: Apr. 27, 2012

(86) PCT No.: PCT/EP2012/057858
§ 371 (c)(1),
(2), (4) Date: Jun. 11, 2013

(87) PCT Pub. No.: WO2012/146758
PCT Pub. Date: Nov. 1, 2012

(65) Prior Publication Data
US 2013/0254843 A1  Sep. 26, 2013

Related U.S. Application Data

(60) Provisional application No. 61/480,401, filed on Apr. 29, 2011.

(30) Foreign Application Priority Data

Oct. 14, 2011 (EP) ..................................... 11185287

(51) Int. Cl.
| | | |
|---|---|---|
| H04L 29/06 | (2006.01) | |
| G06F 21/31 | (2013.01) | |
| G06Q 10/10 | (2012.01) | |
| G06Q 50/00 | (2012.01) | |

(52) U.S. Cl.
CPC .............. *G06F 21/31* (2013.01); *H04L 63/101* (2013.01); *G06Q 10/101* (2013.01); *G06Q 50/01* (2013.01)
USPC .......................................................... 726/28

(58) Field of Classification Search
None
See application file for complete search history.

(56) References Cited

U.S. PATENT DOCUMENTS

| 7,257,271 B2 * | 8/2007 | Adams et al. ................. 382/275 |
| 2007/0002360 A1 * | 1/2007 | Levien et al. ................. 358/1.14 |

(Continued)

OTHER PUBLICATIONS

International Search Report issued in International Application No. PCT/EP201/057858, dated Jul. 5, 2012.

(Continued)

*Primary Examiner* — David Pearson
(74) *Attorney, Agent, or Firm* — DLA Piper LLP US (57) ABSTRACT

A method for controlling access to a visual medium in a social network comprising user units connected to a social network site server associated to a database and a to a distorted visual medium server storing visual media posted by users of the social network. A visual medium is selected by a posting user on a user unit and made available to at least one entitled user of said social network. The posting user defines a list of entitled users to be entitled to access the visual medium, said list of entitled users comprising at least one identifier identifying at least one entitled user, said identifier being associated to a parameter defining an access level to the selected visual medium. The selected visual medium is uploaded to the distorted visual medium server in association with the list of entitled users. The distorted visual medium server stores the visual medium in a memory and applies a distortion effect so as to obtain at least one distorted visual medium degraded according to a predefined degradation level. An entitled user identified on the list receives, from the distorted visual medium server, the visual medium distorted according to a degradation level corresponding to the parameter defining the access level associated to the identifier of the entitled user. The distortion effect applied on the original visual medium preferably consists of a scrambling operation performed on the original visual medium to obtain a scrambled visual medium. The access level defines the rights of a user for descrambling the scrambled visual medium into a reconstructed visual medium. Depending on the user access level, the reconstructed visual medium can be a partially descrambled visual medium or a fully descrambled visual medium according to the user access level.

16 Claims, 5 Drawing Sheets

(56) References Cited

U.S. PATENT DOCUMENTS

2007/0153091 A1* 7/2007 Watlington et al. ...... 348/208.14
2007/0271212 A1* 11/2007 Jones et al. ...................... 707/1
2011/0202968 A1* 8/2011 Nurmi ............................... 726/1

OTHER PUBLICATIONS

Written Opinion issued in International Application No. PCT/EP201/057858, dated Jul. 5, 2012.

* cited by examiner

METHOD FOR CONTROLLING ACCESS TO VISUAL MEDIA IN A SOCIAL NETWORK

The invention relates to a method for controlling access to visual media made available to members of a social network.

INTRODUCTION

In modern social networks, some providers do not effectively protect assets from being distributed unintentionally and accessed by certain sensitive members of the network.

Example of Natasha: she currently lives in Crawford; she has a social network account; as a former resident of Arcata, she has Arcata friends registered as friends of her social network account; as a current teacher to youngsters who are under age, she also has some of her pupils as friends of her social network account. The risk to her is that younger friends may see some risque pictures or videos (visual medium in what follows) that are related to her former life and that she would like to continue sharing with her Arcata friends, or pictures of her that other friends have on their social network accounts.

The operation for a visual medium to end up being managed by the social network provider is called in what follows 'posting visual medium'. Notice there are two basic outcome of this operation: (1) uploading a visual medium to a database controlled by the social network provider; and (2) let it be seen on some pages linked to the user profile, for instance user's albums, walls, or news feeds. We will call the former issue a 'privacy issue for posted visual medium'. We will show this issue concerns both aspects of database storage and of control of the pages disclosing it.

Social network providers manage the privacy issue by providing ways for the user to set up an exact list of her friends who can see the visual media posted on her account. For example, Natasha wants to add to her social network album a photo of the party for her departure on the Arcata beach. She may specify that only Joe and Jack (of Arcata) can see it. This operation becomes cumbersome if she wants all of the 50 friends of this particular party to be entitled to access the photo. It is also very unpractical if she wants to post an image from her mobile device on the go. Moreover, if she forgets someone, this person will never know she did post such nice photo.

So the first problem to be solved is to provide means external to the social network site that allow the user to post a visual medium quickly in any album of the social network site (a wall or a user medium album, depending on the social network site and on the user intents), while being sure the posted visual medium cannot be seen by unwanted people, and while people she could have forgot to entitle can yet see there is a posted visual medium that could interest them. Moreover, the people that would like to see the posted visual medium must be provided with a mean to request access to this visual medium when they see there is one, and to get it in a way that does not require the first user to explicitly re-send the visual medium, so to avoid additional complications that would contradict the ease of use targeted by the solution.

Social network providers avoid distribution costs (i.e. processing, telecom, bandwidth, etc.) by storing users' visual media in unencrypted form. This is detrimental to the privacy of the users. For example, if Natasha posts a visual medium on her social network account, while correctly setting the list of entitled social network friends, she knows the visual medium is still in the clear on the social network server. The visual media can be easily stolen if the social network does not protect against leak with sufficient measures. In addition, the social network provider may offer to users additional features through the usage of third party applications that use dedicated application programming interface (API) to interface with the social network site. Such third party applications often ask the users to grant them access to her visual media. Whereas this may be unwanted by the user, the user may yet want to use an application, and the application may just need to know what albums and what visual medium types our count are in the album. However, for a user aware of privacy issues, it can be quite uncomfortable to give unlimited access to her visual media to such third parties. The user may fear having her visual media revealed to some unwanted people through the application itself.

So, the second problem to be solved is to ensure the user that only versions of visual media that are not visible in the clear by a human eye or a machine are stored and can be accessed by automatic processes, and any mechanism or people that would have access to the databases of visual media, despite the fact that the social network site does not provide such a feature.

Even so, the clear visual media can easily be found in an unsuitable and unwanted location if, for instance, the social network provider let friends of friends access the same clear visual media than the first friends. Usually, this is also solved by dedicated privacy settings globally defining that friends of friends cannot access given posted visual medium. Not only this would add to the impracticality of the posting process but it may just be different from what the user expected. In Natasha's case, she would like that the nice visual medium virally propagates inside the Arcata community. What she wants is a way to let all Arcata former friends and friends of friends know she has this nice visual medium of the beach party, while not letting her pupils access the visual medium, even if it happens they are friends of Arcata friends. This could be solved by even more complex entitlement management tools, for instance by letting the user define which sub-communities of friends of friends are entitled to access the posted visual medium. This would be definitively too complex. If previous problem is solved by storing encrypted visual media, an encrypted version of visual media could be propagated, but in that case the visual medium version is of no use. It does not help other users understand there is an image that could be interesting: In that case, only textual metadata provided with the visual media could be used.

So the third problem to be solved is to let the visual media propagate in some way while keeping control on its access, to virally let any user access the knowledge there is an interesting visual medium, and even let him guess that this visual medium could be nice or interesting by watching a certain version of the visual medium, not only textual information about the existence of such visual medium. This feature is provided despite the fact that the social network site does not provide such a service.

Eventually, users are not always aware of privacy issues. If the social network provider is aware of such issues and think users may post clear visual media while they would later regret to have posted, the social network should provide means to facilitate the usage of the tools he provided to solve the previous issues and motivate the user to deal with this aspect.

So the fourth problem to be solved is to provide fun to the user in the pragmatic and potentially boring task of setting encryption mechanisms and access entitlements of posted visual media. In the context of social networking, the fun for users is per definition in the interaction.

SUMMARY OF THE INVENTION

The aims of the invention are to bring a solution to above mentioned problems by a method for controlling access to a visual medium in a social network, for example in a system of instant messaging or chat room.

The aims are achieved by a method for controlling access to a visual medium in a social network comprising user units connected to a social network site server associated to a database and a to a distorted visual medium server storing visual media posted by users of the social network, a visual medium being selected by a posting user on a user unit and made available to at least one entitled user of said social network characterized in that it comprises steps of:

defining by the posting user a list of entitled users to be entitled to access the visual medium, said list of entitled users comprising at least one identifier identifying at least one entitled user, said identifier being associated to a parameter defining an access level to the selected visual medium, uploading to the distorted visual medium server the selected visual medium in association with the list of entitled users, said distorted visual medium server storing the visual medium in a memory and applying a distortion effect so as to obtain at least one distorted visual medium degraded according to a predefined degradation level, requesting by the entitled user identified in the list of entitled users to download the visual medium and, receiving, from the distorted visual medium server, the visual medium distorted according to a degradation level corresponding to the parameter defining the access level associated to the identifier of the entitled user.

A "distorted visual medium" is to be understood as an image or a video sequence comprising a certain number of visual elements which only outlines can be distinguished by a user without the details of the visual elements which are visible only in the visual medium before being distorted. In other words, a subject of a distorted image remains visible in the great lines contrarily to an encrypted image which appears in form of an unrecognizable image with scattered elements.

The invention can be described as follows, each embodiment being applicable separately or in combination:

According to an embodiment, the invention may be applied in a social network or instant messaging system where connected entitled users access to visual media according to access levels defined by a posting user. The distorted visual medium server produces from the original visual medium selected by the posting user at least one distorted visual medium in order to present a degradation level depending on the access level. The posting user attributes a different degradation level for each user of the social network, selectively by user or by group or by default.

In a first embodiment of the method, the distorted visual medium server stores the posted original visual medium and thus prepares on the basis of the original visual medium a plurality of distorted visual media corresponding to each access level which may be attributed to at least one entitled user of the list of entitled users. Each distorted visual medium is degraded according to a level corresponding to the parameter defining an access level. For example degradation level zero corresponds to the original visual element while a high level of degradation corresponds to a much distorted visual medium. The posting user attributes, by establishing the list, an access level corresponding to a level of degradation of the visual medium, so that the entitled user identified in the list receives a visual medium distorted according to the degradation level defined by the posting user.

According to a preferred embodiment, the original visual medium is sent encrypted by the posting user to the distorted visual medium server, and the distorted visual medium are sent encrypted to the entitled users.

In a second embodiment of the method, the distorted visual medium server stores the original visual medium and thus prepares on the basis of the original visual medium one visual medium distorted with a maximal degradation level and a plurality of recomposition objects allowing reconstructing several degraded visual media from the maximal degraded visual medium according to different degradation levels. Upon request of an entitled user, the distorted visual medium server sends a visual medium degraded according the degradation level defined by the posting user.

The first embodiment may apply to non reversible distortion effects while the second embodiment applies only to reversible distortion effects where a reverse distortion effect or recomposition object is applied on the maximal degraded visual medium.

It has to be noted that a same degradation level may be attributed to different users at the choice of the posting user.

The distortion effect applied on the original visual medium may consist of a scrambling operation performed on the original visual medium to obtain a scrambled visual medium. The access level defines the rights of a user to access a visual medium at a given degradation level. Depending on the user access level, the reconstructed visual medium can be a partially descrambled visual medium or a fully descrambled visual medium (i.e. identical to the original visual medium) according to the user access level. The reconstructed visual medium can be scalable into a plurality of different quality levels so that this visual medium can still be more or less scrambled. Therefore, the reconstruction of this visual medium can be advantageously made in an adaptive and progressive manner. To this end, the present invention allows defining the quality of the reconstructed visual medium by means of the user access level, in particular owing to information or parameters contained in access condition of that user. Thus the descrambling operation is performed selectively according to access criteria. In other words it is performed on demand, according to the profile of the user wanting to handle this visual medium in view to see it, to copy it, to send it or in view of any other purpose. Such a method is useful for advertising/teasing application to stimulate/promote the curiosity for a final consumption.

According to an embodiment, the distortion effect may consist of applying a down-sampling operation to the original visual medium to obtain low resolution visual medium according to the user access levels. Depending on the user access level, the resolution of the visual medium is set more or less lower than the resolution of the original visual medium according to the degradation level applied on the original visual medium. The reconstruction of the visual medium may be performed from the distorted visual medium by using a recomposition object containing the necessary information comprising algorithm and parameters to obtain the visual medium according to the access levels.

A client application for upload is provided to the posting user for uploads. It allows for the selection of an original visual medium, the definition of a list of users to be entitled to access the visual medium that will then be bound to the visual medium, and the selection of a social network site. The client application for upload provides means to request the upload of the visual medium to the selected social network site server. The distorted visual medium is any version of the original visual medium that can be handled by the system and by the social network site server like an ordinary visual medium (i.e. the format of the distorted visual medium is the same as the one of the original visual medium. A distorted visual medium is also visible as a visual medium by a human. But a distorted visual medium has a visual difference that makes part or whole of the original visual medium not identifiable so its meaning and usage are limited. The details can be recognized neither by the human eye nor by the machine algorithms; in particular and typically the identity of people and locations on the visual medium cannot be distinguished.

A client application for download is provided to the entitled user for downloads. It allows for requesting entitlement to access a clear or a visual medium degraded according to the user access level from a display of a corresponding distorted visual medium. A clear visual medium is a version of the original visual medium which is visually equivalent, i.e. in which there is no distortion effect (but it is not necessarily the same bit-code). If the requesting user belongs to the entitlement list bound to the distorted visual medium, the entitlement request results in the display of the clear or a degraded visual medium by the client application for download. Else, the entitlement request results in sending a demand to the posting user to add the entitlement requesting user in the entitlement list bound to the distorted visual medium. The client application for download also provides means for posting users to check the pending entitlement requests resulting from the previous case, and add selected entitlement requesting users to the entitlement list. The posting user may use the client application for download at any time to add other users in entitlement list independently from the actual entitlement requests.

A distorted visual medium server is in charge of interfacing between the client application for upload and the social network site server or between the client application for download and the social network site server in what concerns the management of distorted visual medium uploaded on the social network server, so to enable the previous functions describing the client application for upload and client application for download. The client application for upload is configured to send its visual medium upload requests to the distorted visual medium server. Upon the reception of such a request, the distorted visual medium server uploads the distorted visual medium to the social network site server. According to the second embodiment, it stores the information required to create the clear visual medium from the distorted visual medium. This information constitutes a recomposition object. It also stores the related entitlement list and an identifier of the posting user into an entitlement object. The distorted visual medium server maintains a table to keep the correspondence between the actual distorted visual medium object stored in the social network site server, the recomposition objects and the entitlement object. The client application for download is configured to send its entitlement upload requests to the distorted visual medium server. Upon the reception of such a request, if the entitlement requesting user belongs to the entitlement list bound to the distorted visual medium concerned by the request, the distorted visual medium server sends the clear visual medium or a visual medium degraded according to an access level to the client application for download; else it stores a notification of an entitlement request to the posting user. Notifications are handled by the client application for download. When the user launches the client application for download, the client application for download connects to the distorted visual medium server and displays pending notifications.

BRIEF DESCRIPTION OF THE DRAWINGS

The invention will be better understood with the following detailed description, which refers to the attached figures given as non-limitative examples.

DETAILED DESCRIPTION OF THE INVENTION

Figure 1:
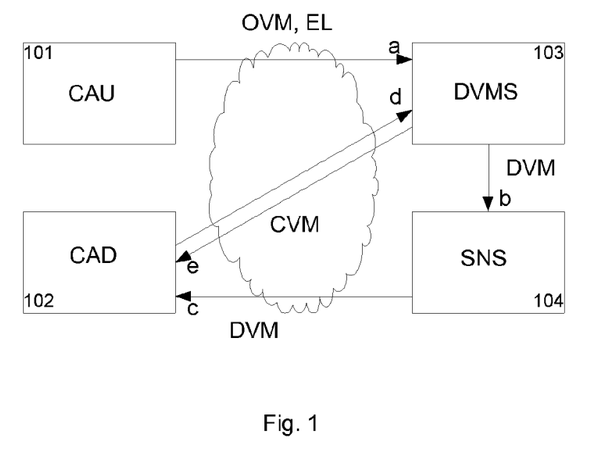
FIG. 1 shows a general block diagram of the method of the invention where an original visual medium and an entitlement list is uploaded via a communication network to a media server which forwards a distorted visual medium to a social network server.

In FIG. 1, the client application for upload (CAU) (101) uploads (a) data, including the original visual medium (OVM) and entitlement list (EL), to the distorted visual medium server (DVMS) (103), which forwards (b) the distorted visual medium (DVM) to the social network site server (SNS) (104). The client application for download (CAD) (102) gets (c) the distorted visual medium (DVM) from the social network site server and requests (d) and obtains (e) a clear visual medium (CVM) or a visual medium degraded according to the access level defined in the entitlement list (EL).

There are different ways to implement the clients and the distorted visual medium server (DVMS) must support these different implementations of the client application for upload (CAU) and client application for download (CAD). From the user point of view, the client application for upload (CAU) and the client application for download (CAD) can just be two expressions of the same application. In an embodiment, the client application for upload (CAU) and/or client application for download (CAD) are Web applications. In another embodiment, the client application for upload (CAU) and/or client application for download (CAD) are native applications. In another embodiment, the client application for upload (CAU) and/or client application for download (CAD) are dedicated hardware pieces. In an embodiment, one or both of the client applications client application for upload (CAU) and client application for download (CAD) are embedded in an application provided by the social network site server (if the application is a Web application, the graphical user interface of the client application for upload (CAU) and/or client application for download (CAD) are rendered as frames embedded in pages delivered by the social network site server). In this case, the selection of the social network site is implicit: the user first selects the social network site and then access the client application for upload (CAU) or client application for download (CAD) for this site.

According to the implementation of the client, two main possibilities to implement the distorted visual medium (DVM) upload request must be supported by the distorted visual medium server (DVMS). In a first case, the client application for upload (CAU) has means to create the distorted visual medium (DVM) by itself. For instance, if the client application for upload (CAU) is an application implemented as a native application on some operating system (OS), it will be preferred to embed means to create the distorted visual medium (DVM) in the client application for upload (CAU). Else, if the client is a Web application running in a standard browser, a plug-in may be provided but the user will not always agree to install it.

Thus in the case where the client application for upload (CAU) has no means to create the distorted visual medium (DVM), the distorted visual medium (DVM) upload request sent by the client application for upload (CAU) is implemented as follow. The original visual medium (OVM) is securely uploaded to the distorted visual medium server (DVMS) together with the entitlement list (EL), using a secured connection. The distorted visual medium server (DVMS) applies the applied distortion effect (ADE) to create the distorted visual medium (DVM) and recomposition objects (RO) or only several distorted visual media according to corresponding degradation levels.

Since the purpose of the invention is to support the upload and download of distorted visual medium (DVM) to any social network site, regardless of the specific integration of the social network site with the distorted visual medium server (DVMS). If the social network site server provides means to the distorted visual medium server (DVMS) to upload visual media, then the distorted visual medium server (DVMS) simply uploads the distorted visual medium (DVM) to the social network site server using said means. It receives an identifier of the uploaded distorted visual medium (DVM) at the social network site. It may happen that the social network site server provides specific means to the client application at the posting user side whereas these means are not available to the distorted visual medium server (DVMS), or the social network site server rejects connections from such a server. In this case, the distorted visual medium server (DVMS) sends back the created distorted visual medium (DVM) to the client application for upload (CAU). The client application for upload (CAU) automatically uploads it to the social network site server using the usual means it provides for uploads of visual media. It gets back the identifier of the uploaded distorted visual medium (DVM) at the social network site and sends this identifier back to the distorted visual medium server (DVMS).

In all cases, once the distorted visual medium server (DVMS) received the identifier of the uploaded distorted visual medium (DVM) at the social network site, it creates the entitlement object (EO), encapsulating the entitlement list (EL) and the posting user identifier. It stores the corresponding recomposition object (RO) if necessary and entitlement object (EO) together with said distorted visual medium (DVM) identifier.

Figure 2:
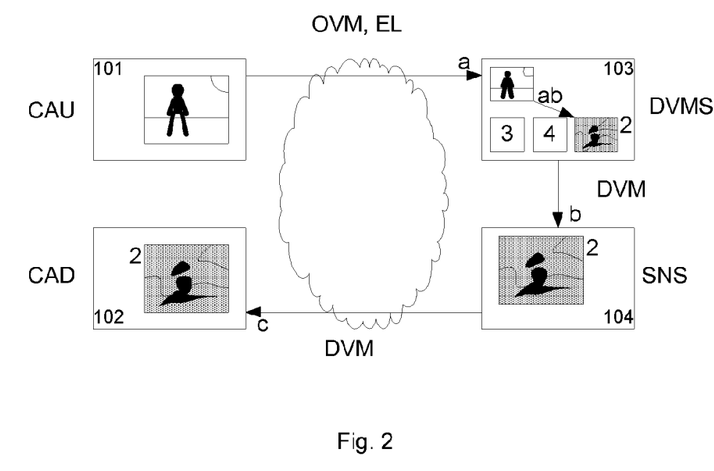
FIG. 2 shows the block diagram of FIG. 1 with details illustrating operations performed by the media server which builds, from an uploaded original visual medium and entitlement list, a distorted visual medium, a recomposition object and an entitlement object and forwards the distorted visual medium to the social network server.

In FIG. 2, the client application for upload (CAU) (101) uploads (a) the original visual medium (OVM) (1) and entitlement list (EL) to the distorted visual medium server (DVMS) (103), which builds the distorted visual medium (DVM) (2) and the recomposition object (RO) (3) and entitlement object (EO) (4), then forwards (b) distorted visual medium (DVM) to the social network site server (SNS) (104). The client application for download (CAD) (102) gets (c) the distorted visual medium (DVM) from the social network site server (SNS).

In the case where the client application for upload (CAU) has means to create the distorted visual medium (DVM), the distorted visual medium (DVM) upload request sent by the client application for upload (CAU) is implemented as follow. The client application for upload (CAU) applies the selected applied distortion effect (ADE) itself, to produce the distorted visual medium (DVM) and recomposition object (RO).

If the client application for upload (CAU) uploads the distorted visual medium (DVM) to the social network site server using the usual means the social network site provides for uploads of visual media, it gets back the identifier of the uploaded distorted visual medium (DVM) at the social network site and sends this identifier to the distorted visual medium server (DVMS) with the recomposition objects (RO) and entitlement list (EL). Else the client application for upload (CAU) may just send the distorted visual medium (DVM), the recomposition objects (RO) and the entitlement list (EL) to the distorted visual medium server (DVMS), and it is the distorted visual medium server (DVMS) which uploads the distorted visual medium (DVM) to the social network site server and receives the distorted visual medium (DVM) identifier. The recomposition objects (RO) and entitlement list (EL) are sent through a secure connection. At the end, the distorted visual medium server (DVMS) creates the entitlement object (EO), encapsulating the entitlement list (EL) and the posting user identifier. It stores the corresponding recomposition object (RO) and entitlement object (EO) together with said distorted visual medium (DVM) identifier.

In all cases, the invention may be sum up as follow: it consists in a server which has means to store recomposition objects (RO) and entitlement object (EO) securely, to associate them with distorted visual medium (DVM) uploaded in a social network site server, and to provide clear visual medium (CVM) when a download request is received from an entitled user.

In an embodiment, the applied distortion effect (ADE) selection is augmented with the selection of a distortion level; in another embodiment the effect is fixed and only the distortion level defines the effect and can be tuned by the client application. In yet another embodiment, the distortion effect can be applied to a part of the original visual medium (OVM) only. In that case, the distorted part can be defined by the posting user or it is automatically computed, for instance by using a visual media analysis algorithm (e.g. to recognize faces, or text) and applying the distortion effect only on part detected by said algorithm.

If there exists an operation of recomposition that can build the clear visual medium (CVM) from the distorted visual medium (DVM) and the recomposition object (RO), the applied distortion effect (ADE) will be said to be reversible. In the case where the applied distortion effect (ADE) is reversible, it is preferred that the distorted visual medium server (DVMS) stores an encrypted version of the recomposition objects (RO). By doing so, a malevolent attacker of the distorted visual medium server (DVMS) storage system will not be able to recompose clear visual medium (CVM). The recomposition objects (RO) decryption key is stored in the entitlement object (EO) and the distorted visual medium server (DVMS) must only provide ways to protect the entitlement object (EO) but has not to protect the storage of the distorted visual medium (DVM) and recomposition objects (RO).

In that case, and if the social network site server does not guarantee that its method of visual medium storage does preserve the stored medium, the distorted visual medium server (DVMS) must additionally store the distorted visual medium (DVM) with the recomposition objects (RO) and entitlement object (EO). Indeed, it can happen that the recomposition operation will not work with the distorted visual medium (DVM) stored by and retrieved from the social network site server. By storing the distorted visual medium (DVM), the distorted visual medium server (DVMS) will always be able to recompose the clear visual medium (CVM).

The distorted visual medium server (DVMS) implements download with methods adapted to the previous cases. The download is the response to the client application for download (CAD) entitlement requests in the case where the requesting user is entitled to access the clear visual medium (CVM). Following such a request, a clear visual medium (CVM) must be available to the client application for download (CAD). Symmetrically to previous client application for upload (CAU) implementation cases, the client application for download (CAD) may have means to perform the recomposition operation (native application or Web browser equipped with convenient plug-in) or may not.

If the client application for download (CAD) has means to perform the recomposition operation, the distorted visual medium server (DVMS) sends a suitable recomposition object (RO). If the recomposition object (RO) is not encrypted, it sends it through a secure connection. If a recomposition object (RO) is encrypted, the distorted visual medium server (DVMS) may use a non-secure connection to send the recomposition object (RO), and then sends through a secure connection the decryption key found in the bound entitlement object (EO). The distorted visual medium server (DVMS) also sends the distorted visual medium (DVM) if the recomposition operation has to use it (i.e. if the applied distortion effect (ADE) is reversible).

In that case, another embodiment is possible. The client application for download (CAD) may implement means to browse directly the albums found in the social network site without using the display means provided by the social network site server. If the client application for download (CAD) detects a distorted visual medium (DVM) and that the user is entitled to see the related clear visual medium (CVM), then the client application for download (CAD) automatically builds the clear visual medium (CVM); in that case the entitled users never see the distorted version.

If the client application for download (CAD) has no means to perform the recomposition operation, the distorted visual medium server (DVMS) performs the operation and then sends the clear visual medium (CVM) or a visual medium degraded according to user access level through a secure connection.

In an embodiment, the entitlement objects (EO) is encrypted with a user private key, possibly using asymmetric encryption. The previous methods must be adapted to this embodiment as follows. First, it is necessary the client application for upload (CAU) has means to manage encryption of entitlement object (EO) and the client application for download (CAD) has means to manage decryption of entitlement object (EO). In turn, it necessitates the client application for upload (CAU) has means to build the entitlement object (EO) that includes the appropriate recomposition object (RO) encryption key; the decryption of the entitlement object (EO) gives access to the key encrypting the recomposition object (RO) and the decryption of the recomposition object (RO) allows building the distorted visual medium server (DVMS). Thus this encryption approach makes sense only in the case where the client application for upload (CAU) has means to build the distorted visual medium (DVM) and the client application for download (CAD) has means to recompose the clear visual medium (CVM).

At the end of the upload operation, the client application for upload (CAU) builds the entitlement object (EO) by itself, encrypts it with the user key, and sends the resulting encrypted entitlement object (EO) to the distorted visual medium server (DVMS). Since the distorted visual medium server (DVMS) may not read the encrypted entitlement object (EO), it cannot grant or deny access to the clear visual medium (CVM) to entitlement requesting users. Then, the management of entitlement requests is adapted as follows. The client application for download (CAD) of the requesting user sends a public key of the requesting user with the entitlement request. Upon the reception of such a request, the distorted visual medium server (DVMS) notifies the posting user and inserts the requesting user public key and the encrypted entitlement object (EO) in the notification. Upon handling of such a notification by the posting user, the client application for download (CAD) decrypts the entitlement object (EO) with the user private key and if the user accepts to grant access to the clear visual medium (CVM), the client application for download (CAD) sends an authorization object (AO) to the distorted visual medium server (DVMS) for the requesting user; this authorization object (AO) is encrypted with the key of the requesting user and contains the key encrypting the recomposition object (RO) that was found into the entitlement object (EO). The distorted visual medium server (DVMS) notifies the requesting user and inserts the recomposition object (RO) and authorization object (AO) in the notification. Eventually, the client application for download (CAD) of the requesting user upon handling of the notification decrypts the authorization object (AO), gets the recomposition object (RO) decryption key, decrypts the recomposition object (RO) and uses it to build the clear visual medium (CVM) or a visual medium degraded according to user access level.

The system and methods of the invention address the four mentioned problems in once.

The core of the invention is the introduction and mastering of a distortion effect and of the use of a server that is in charge of providing the features; the social network site server is not providing while enabling the usual posting facilities.

The first problem ("help the user to post a visual medium quickly in any album, while being sure the posted visual medium cannot be seen by unwanted people, and while people she could have forgot to entitle can yet see there is a posted visual medium that could interest them and request it easily") is solved by the fact that the distorted visual medium (DVM) is visible by all users entitled to access the user album on the social network site. This is the case thanks to the fact the distorted visual medium (DVM) has the same format as the posted visual media supported by the social network site server. It can be easily posted using the same mechanism than the one used for the usual clear visual medium, as supplied by the social network provider.

The posting action is quick indeed. The user who wishes to post a visual medium must just choose through the client application for upload (CAU) to distort the original visual medium to be posted. The user can also set a parameter telling that posted visual media are distorted by default, so that the posting process is not more cumbersome than in the clear case. Then, the posting user may define in the entitlement list (EL) which of his friends is entitled to access to the clear visual medium. This is not more cumbersome than defining limited access to the clear visual medium in the usual case.

To the user who notices the posted distorted visual medium (DVM) on the social network site and wants to see the clear visual medium (CVM), the system provides means to easily request the clear visual medium (CVM). If the user is already entitled to see the clear visual medium (CVM), the request immediately results in the display of the clear visual medium (CVM). Thus, the visualization of clear visual medium (CVM) just takes one more click than in the usual case of not protected media. If the client application for download (CAD) has means to recompose clear visual medium (CVM) and to browse user's albums, this step may even be removed for entitled users.

Since it is only the distorted visual medium (DVM) which is stored by the social network site server, the second problem (ensure the user that only versions of visual media that are not visible in the clear by a human eye or a machine are stored and can be accessed by automatic processes, and any mechanism or people that would have access to the databases of visual media) is solved: no attacker of the social network site may access the clear visual medium (CVM). With the protection of recomposition object (RO) ensured by the distorted visual medium server (DVMS), attackers of the distorted visual medium server (DVMS) can neither access the clear visual medium (CVM).

The third problem ("let the visual media propagate while keeping control on its access, to let any user access the knowledge there is an interesting visual medium, and even let him guess that this visual medium could be nice or interesting by watching a certain version of the visual medium, not only textual information about the existence of such visual medium") is solved by the fact that the distorted visual medium (DVM) is visible by all users entitled to access the user album on the social network site. As a result of the posting of the distorted visual medium (DVM) by the distorted visual medium server (DVMS), the distorted visual medium (DVM) is visible on the social network site by any user who has access to the posting user's albums. But the distorted visual medium (DVM) by nature is a distorted version of the original visual medium (OVM) that still makes sense as a visual medium but hides the important information.

The fourth problem ("provide fun to the user in the pragmatic and potentially boring task of setting distortion and access entitlements of posted visual media") is solved by letting the posting user play with different distortion effects and/or different distortion levels. The distortion level may be seen as a control, on the enticing effect.

Moreover, the notification mechanism adds interactions between users which is just the basis and goal of social networking. Thus fun for users is ensured in the very core of the social network activity.

The above described embodiments include one recomposition object (RO) for reconstructing a clear visual medium from a distorted visual medium. In the case where more than one access levels are defined, corresponding recomposition objects have to be defined for creating visual media from a maximal degraded visual medium according to available access levels.

According to the first embodiment, the original visual medium is distorted by the distorted visual medium server (DVMS) in such a way to obtain a number of degraded visual media according to the number of levels corresponding to the one of available access levels. To each access level corresponds a degradation level of the visual media. The different distorted visual media are stored in a memory of the distorted medium server as well as the original visual medium and the list (EL) of the entitled users. When an entitled user identified by the list (EL) stored in the distorted visual medium server (DVMS) requests a download of a visual medium, the distorted visual medium server delivers either a visual media corresponding to the original one (degradation level zero) or a visual medium degraded according to the access level (degradation level >0) defined by the posting user in the entitlement list (EL).

According to the second embodiment, the original visual medium is distorted by the distorted visual medium server (DVMS) in such a way to obtain a maximal degraded visual medium. The distorted visual medium server (DVMS) further generates a number of recomposition objects corresponding to the number of access levels, respectively degradation levels of the visual medium. The original visual medium, the maximal degraded visual object, the recomposition objects and the entitlement list (E) are store stored in a memory of the distorted visual medium server (DVMS). When an entitled user identified by the list (EL) stored in the distorted visual medium server (DVMS) requests a download of a visual medium, the distorted visual medium server reconstructs either a visual media corresponding to the original one (degradation level zero) or a visual medium degraded according to the access level (degradation level >0) defined by the posting user in the entitlement list (EL).

Figure 3:
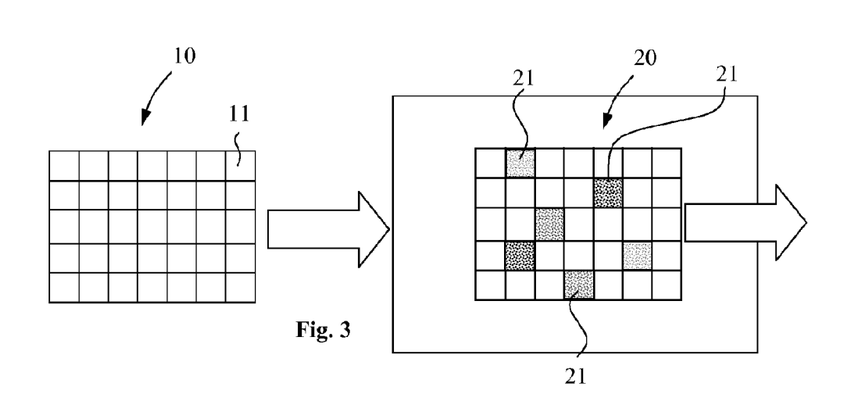
FIG. 3 schematically shows the transformation of an original visual medium into a scrambled visual medium according to the present invention.

FIG. 3 schematically illustrates the transformation of an original visual medium in form of an image into a scrambled image 20. The so called original image 10 is a compressed image having a coding format that is recognized by common players able to process such a digital image. As schematically shown in this figure, the original image 10 is divided into successive blocks 11, each corresponding to a subimage of the original image 10. The divided image is stored in a memory (of the system for scrambling the original image) in this coding format as a set of syntax elements. According to an embodiment, these syntax elements are DC coefficients and AC coefficients. Each block 11 was a matrix of 8×8 pixels which has been converted during the compression process into blocks of coefficients by means of a transformation function. Such a function can be for instance a discrete cosine transform (DCT). This kind of transformation is typically used by JPEG and MPEG standards and is therefore well known by the person skilled in the art. Each block of 64 coefficients can be then further quantized with the help of a quantization matrix of size 8×8. Although the following description refers to blocks of coefficients, in particular to DC and AC coefficients taken as preferred components, it should be understood that other coefficients or parameters, such as the elements of the quantization matrix, could be also taken into consideration instead of said coefficients DC, AC.

As shown in FIG. 3, the original image is transformed into a scrambled image 20. This image 20 is defined as scrambling image given that it comprises a plurality of blocks 21 which have been scrambled. According to the invention, the scrambled image 20 is a scalable image comprising several levels of degradation shown in this Figure by the different grey levels of the scrambled blocks 21.

Figure 4:
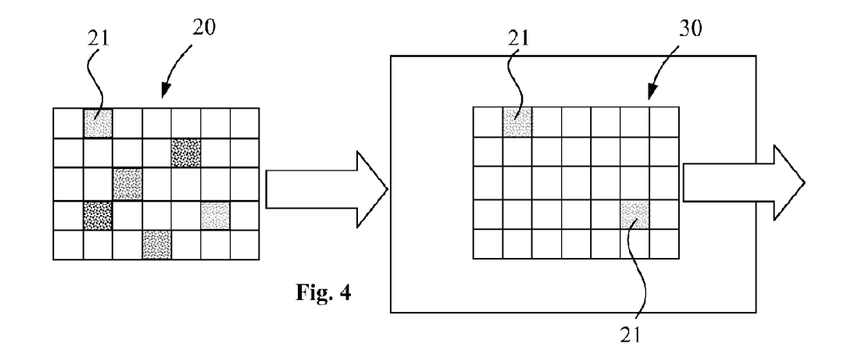
FIG. 4 schematically shows the transformation of the scrambled visual medium of FIG. 1 into a reconstructed visual medium according to the present invention.

FIG. 4 shows the transformation of the scrambled image 20 of FIG. 3 into a reconstructed image 30 according to the descrambling operation of the method suggested by the present invention. As shown in this figure, the reconstructed image 30 can be different from the original image 10 given that the reconstructed image can still comprises some scrambled block 21. Depending on an access level assigned to a user wanting to descramble the scrambled image 20, the reconstructed image 30 can be still partially scrambled (i.e. several scrambled blocks remain intact) or can be fully reconstructed so as to be identical as the original image 10.

Figure 5:
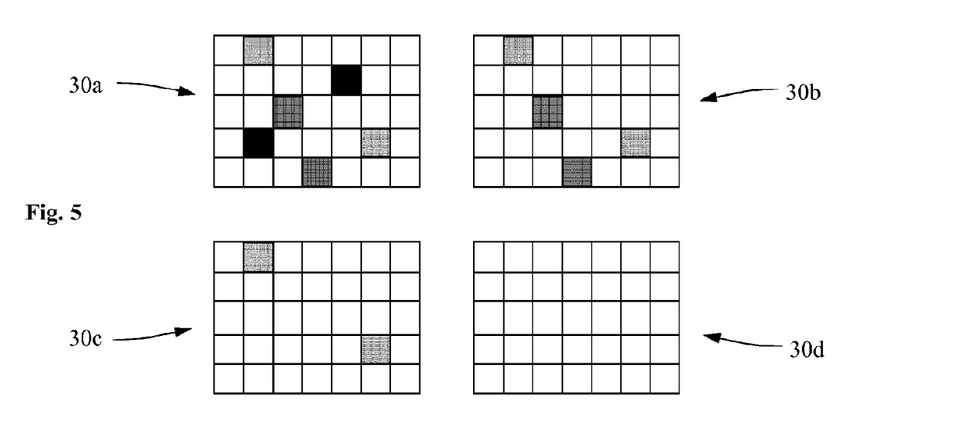
FIG. 5 shows, as example, four different levels of descrambling of the reconstructed visual medium depending on user access levels.

FIG. 5 shows, as example, four different descrambling levels of the reconstructed image, each level representing a different user access level. These levels of degradation are schematically represented by blocks of different grey levels. By comparing the scrambled image 20 of FIG. 3 or FIG. 4, the reconstructed image 30a remains scrambled since no block 21 has been descrambled in the reconstructed image. This case may typically correspond to a denied access to get a reconstructed image for a certain user. The reconstructed image 30b corresponds to a poor access given that this image remains rather scrambled. The image 30c is rather a good reconstructed image corresponding to a better quality given that the remaining degradation level is quite low. It corresponds to a better user access level. The last reconstructed image 30d is a fully reconstructed image corresponding to the original image 10 since all the scrambled blocks 21 have disappeared. As illustrated in FIG. 3, one of the aims of the present invention is to provide a method wherein the reconstructed image can be provided with different degradation levels.

Figure 6:
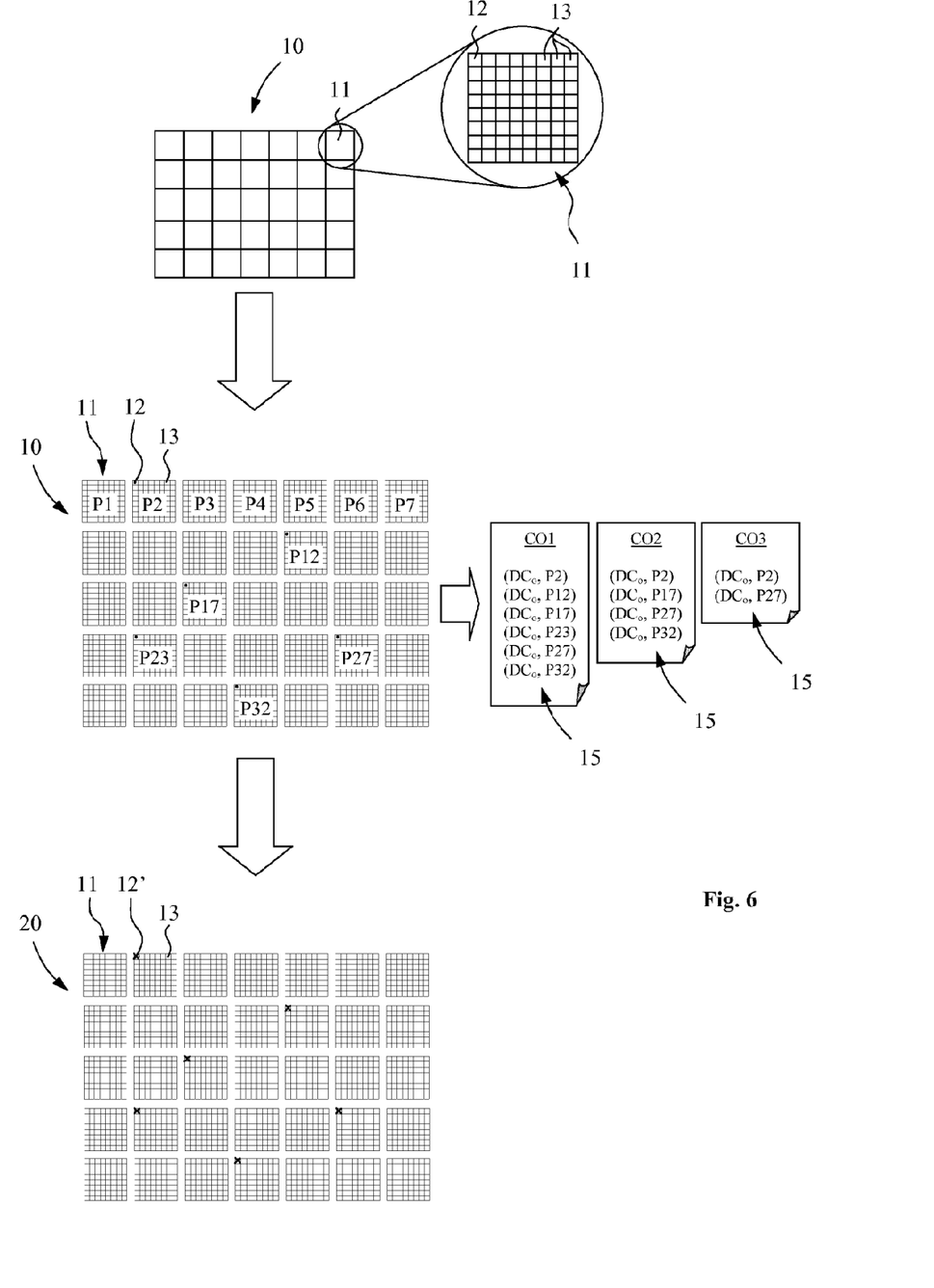
FIG. 6 shows the scrambling operation according to one embodiment of the method of the present invention.

Referring to FIG. 6, the scrambling operation is now explained in more detail in the case of JPEG encoding format according to a preferred embodiment of the method of the present invention. Overall, the scrambling operation aims to substitute original data by other data which are denoted luring data or fake data. Each block 11 of the original image is made of a matrix of DC and AC coefficients, in particular one DC coefficient 12 and a plurality of AC coefficients 13. The DC coefficient (Direct Coefficient) is the first coefficient of the block on the top left of the matrix, i.e. at the position (0,0) marked by a small black spot in FIG. 6. The DC coefficients 12 of all blocks 11 are encoded in the differential manner according to the JPEG standard. Therefore, the blocks 11 are dependent on each other. This dependency can affect the whole image, or groups of successive blocks separated by a special syntax element in the encoded image, namely a Restart Marker. Restart Markers act as separator, the very first DC coefficient following a Restart Marker being encoded independently, the successive DC ones being again encoded differently until the occurrence of the next Restart Marker, or the end of image.

The DC coefficient 12 represents an average intensity of its block and therefore refers to an average of the quantity of the matrix of the coefficients. The AC coefficients are the remaining elements of the matrix. From the top left to the bottom right, the AC coefficients represent respectively the low to high frequency factors in the 2-dimensional space.

According to an embodiment, several blocks of original image 10 (marked as P1 . . . P7, P12, P17, P23, P27 and P32 in FIG. 6) will be scrambled.

According to a preferred embodiment, the structure of the original image 10 and original DC coefficients 12 extracted from the aforementioned blocks are shown in FIG. 6. The original DC coefficients 12 in the targeted blocks located at positions P2, P12, P17, P23, P27 and P32 are replaced with luring coefficients 12'. The value of the luring coefficient 12' can be generated, for example, according to a random process. The values of original DC coefficients 12 and the locations of their blocks (i.e. positions P2, P12 . . . within the image 10) are saved in the original data 15 in a form of 2-tuple data. For instance, the 2-tuple data (DC0, P2) in FIG. 6 refers to the original value of the DC coefficient of the block 11 located at position P2. All the 2-tuple data of the original data 15 are arranged into a plurality of control objects CO1, CO2, CO3, which are independently incorporated into the descrambling process later on to reconstruct the image with different level of degradation. Each time a block of coefficients is lured by at least one luring coefficient 12', original data 15, namely the original coefficient 12 which has been substituted by the luring coefficient 12', must be stored (i.e. saved) in view of a reverse process aiming to recover at least a partially descrambled image.

According to the present method, the first step of the scrambling operation is to receive the original image 10 structured according to a predefined coding format so as to be readable by common players. Preferably, this coding format refers to a differential coding so that a current DC coefficient of a certain block can be determined e.g. by subtracting the value of the non-encoded previous DC coefficient to the value of non-encoded current DC coefficient.

Then, the second step refers to the substitution of a plurality of DC coefficients 12 by luring coefficients 12' of the same nature so as to maintain this coding format. It means that, on the one hand, there is no intention to mix the blocks (or the pixels) within the image but the scrambling effect is obtained by altering certain blocks 11 (in particular by substituting original DC coefficients with luring coefficients 12' to get lured coefficients) while retaining their position within the image, and on the other hand that luring coefficients are conform to the syntax of the image format (syntax of the used codec) so as to be readable by common players. The substituted DC coefficients 12 (i.e. lured DC coefficients) are identified by positions P2, P12, P17, P23, P27 and P32 in the example of FIG. 6.

As shown in the middle of FIG. 6 referring to the third step of scrambling operation, each of these substituted DC coefficients 12 (i.e. the values of these coefficients), together with their respective position within the image, is stored as original data 15 into at least two control object CO1, CO2. In the example of FIG. 6, three control objects CO1, CO2, CO3 are used for storing the original data 15, each 2-tuple data formed by the original value of the DC coefficient 12 and its position P. According to the embodiment disclosed in this figure, the first control object CO1 comprises all of the original data 15, namely the six original DC coefficients 12 (also denoted DCo) and their position P. The second control object CO2 only comprises a subset of original data 15 of the first control object CO1, namely the values DCo of the original DC coefficients 12 located at positions P2, P17, P27, P32. The last control object CO3 also comprises a subset of the original data 15 present in one of the previous control objects CO1, CO2, in particular original DC coefficients 12 of positions P2 and P27.

Each control objects CO1, CO2, CO3 corresponds to a degradation level of the original image 10 since the first control object CO1 comprises all the required original data 15 to recover the original image, whereas each of the other control objects CO2, CO3 only comprises a specific part of all the original data. The degradation level of the third control object CO3 is therefore higher than the degradation levels of the two other control objects CO1 and CO2.

According to a further embodiment in which the syntax elements SEs of blocks 11 are made of quantizers instead of DC/AC coefficients, the substitution is applied to the quantizers in the quantification table. Because the quantification table is a global parameter of the JPEG format, modifying its quantizers affects all blocks of the compressed image. Therefore the 2-tuple data in the original data 15 no longer contain the position of the affected block. Instead, they consist of the original quantizer and its index-location in the quantization table. For instance, a possible original data 15 can be (Ql,l), which refers to an original value Q of a quantizer at the location l (l□[0 . . . 63]) of the quantization table. A control object CON containing only the quantizer at the lower location l (scaler of low frequency coefficients) produces more degradation than those having the quantizer at higher location l (corresponding to high frequency coefficients).

Figure 7:
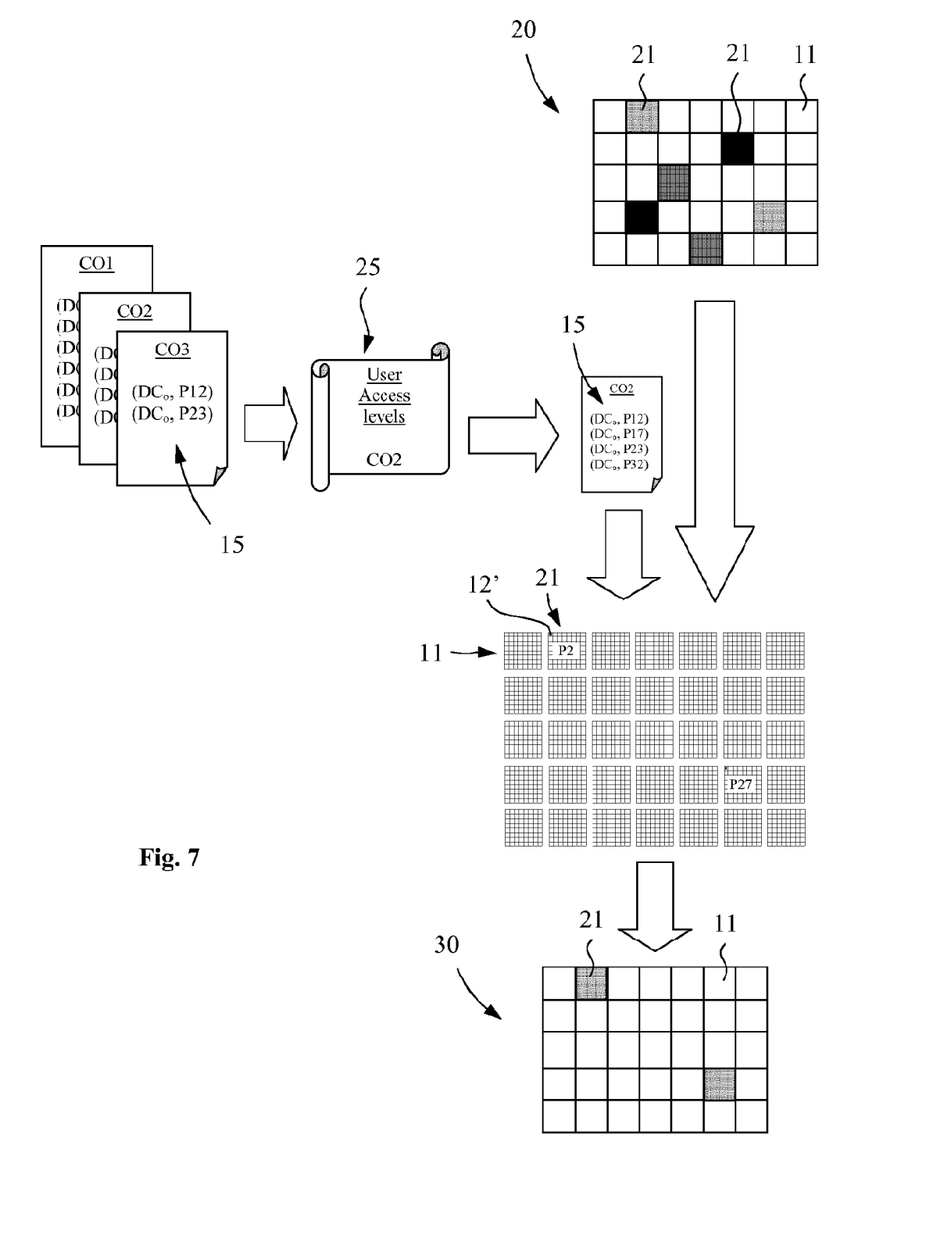
FIG. 7 shows the descrambling operation that is made after the scrambling operation of FIG. 6 to get a reconstructed visual medium.

The descrambling operation made, as a pseudo-reverse operation, after the above scrambling operation is schematically shown in FIG. 7. The first step of the descrambling operation is to receive the scrambled image 20 on the one hand, and the control objects CO1, CO2, CO3 on the other hand, either by the same channel or by two different channels (data streams). All the control objects are used as input for the descrambling operation. The second step refers to select at least one of these control objects on the basis of a user access level 25. The user access level can be regarded as a parameter that is specific for a certain user. It defines the remaining degradation level of the reconstructed image, i.e. the quality of the descrambled image after the descrambling operation. The user access level can be provided to the descrambling operation as a specific input each time the user wants to access to a scrambled image. Alternatively, the user access level can be stored in a memory of the device which performs the descrambling operation.

As shown as example in FIG. 7, the user access level 25 refers to the control object CO2, namely to original data 15 corresponding to positions P12, P17, P23 and P32 of the image 10, 20. According to the embodiment illustrated in this figure, the control object CO2 (comprising the original data 15) allows to restore original DC coefficients 12 located at these four positions. Consequently, the luring coefficients 12' located at positions P2 and P27 cannot be removed given that original data of these two coefficients are not comprised in the control object CO2, but in the control object CO3 which is not designated by the user access level 25. As a result, the reconstructed image 30 still comprises two lured blocks of coefficients, as shown in FIG. 7. Therefore, the descrambling image 30 is not the same quality as the original image 10.

Figure 8:
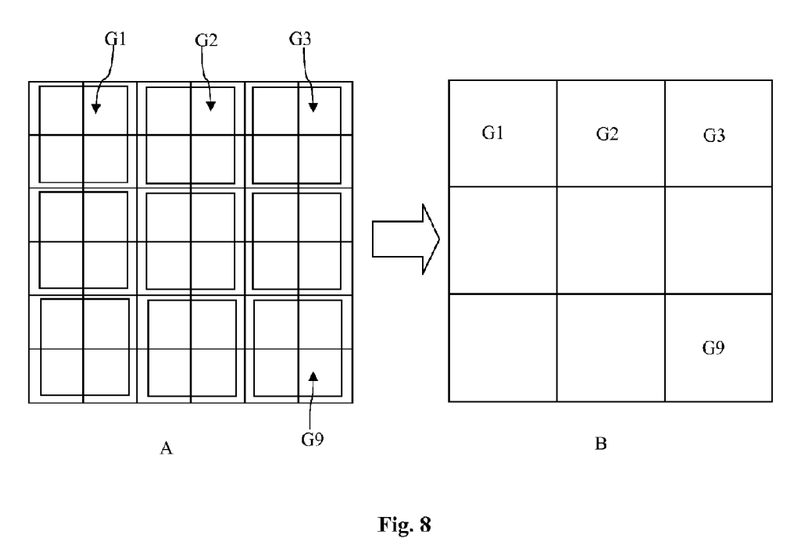
FIG. 8 shows a schematic example of degradation of a visual medium by down-sampling a corresponding bitmap to reduce the resolution.

According to a further embodiment, the visual medium may be distorted respectively degraded by down-sampling i.e. lowering the resolution to values corresponding to degradation levels defined by access levels related to the visual medium. In the schematic example illustrated by FIG. 8, the visual medium in form of an image bitmap A is downsized by half from 6×6 pixels to 3×3 pixels forming the degraded image B. It means that four pixels in a square are converted into groups (G1, G2, G3 . . . G9) representing a single pixel in the degraded image B. The conversion may be performed by taking either the maximum value, or the minimum value or the average value of the four pixels. The down-sampling can be carried out on any size or resolution of an image by forming groups formed by a square or a rectangle of a number of adjacent pixels depending on the degradation level to attribute on the original image. An important degradation or a high level of degradation of the image results to a low resolution so that the image becomes unrecognizable. A similar down-sampling mechanism is used for compressing images or video sequences notably according to JPEG (Joint Photographic Experts Group) standard. It has to be noted that the down-sampling is performed only on images in form of bitmaps but not on images compressed in JPEG format for example.

The visual medium distorted or degraded by down-sampling may be reconstructed by using the recomposition object (RO) comprising the algorithm and the parameters to be applied on the distorted visual medium to obtain a visual medium in full resolution or in a lower resolution determined according to the access levels. The resolution of the reconstructed visual medium will be thus equivalent or lower than the one of the original visual medium in order to present an acceptable visual quality contrarily to the degraded visual medium.

Figure 9:
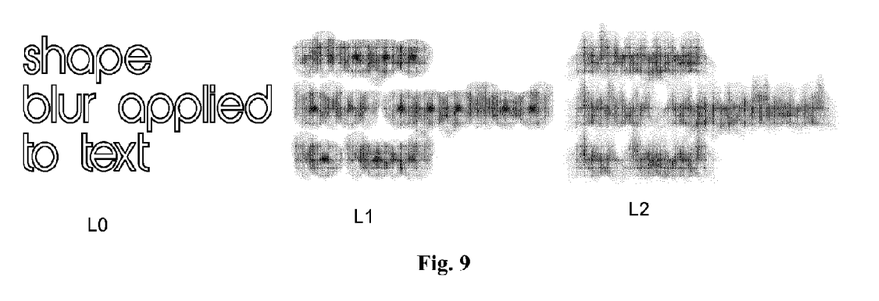
FIG. 9 shows an example of degradation according to two levels by down-sampling or blurring an original image.

FIG. 9 illustrates an example of the visual effect produced by two levels L1 and L2 of a degradation of an original image L0 performed by down-sampling or blurring. The second level L2 of degradation hides the details of the image so that the visibility is reduced involving getting the appropriate access level is required to distinguish details as in the original image of level L0.

LIST OF ABBREVIATIONS

ADE—applied distortion effect
AO—authorization object
CAD—client application for download
CAU—client application for upload
CVM—clear visual medium
DVM—distorted visual medium
DVMS—distorted visual medium server
EL—entitlement list
EO—entitlement object
OVM—original visual medium
RO—recomposition object

The invention claimed is:

1. A method for controlling access to a visual medium in a social network comprising user units connected to a social network site server associated to a database and a distorted visual medium server storing visual media posted by users of the social network, each of the user units comprising a processor and a display, the method comprising the steps of:

receiving, by a distorted visual medium server, a visual medium from a user unit of a posting user via a client application and making the visual medium available to at least one entitled user of said social network;

receiving, by the distorted visual medium server from the user unit of the posting user, a list of entitled users to be entitled to access the visual medium, said list of entitled users comprising at least one identifier identifying at least one entitled user, said identifier being associated to a parameter defining an access level to the selected visual medium;

storing, by the distorted visual medium server, the visual medium in association with the list of entitled users in a memory and applying a distortion effect to the visual medium so as to obtain at least one distorted visual medium degraded according to a predefined degradation level;

receiving, by the distorted medium server, a request to download or stream the visual medium to an entitled user identified in the list of entitled users; and transmitting, by the distorted visual medium server, the visual medium distorted according to a degradation level corresponding to the parameter defining the access level associated to the identifier of the entitled user;

wherein the distorted visual medium server stores the original visual medium and prepares on the basis of the original visual medium one visual medium distorted with a maximal degradation level and a plurality of recomposition objects allowing reconstructing a plurality of degraded visual media from the maximal degraded visual medium according to different degradation levels, each corresponding to an access level attributed to at least one entitled user of the list of entitled users.

2. The method according to claim 1, wherein the visual medium including a digital image is distorted by scrambling an original image into a scrambled image by the steps of:
receiving the original image having a coding format, said image being divided into successive blocks and being stored in said coding format as a set of syntax elements;
substituting a plurality of said syntax elements by luring syntax elements of the same nature so as to keep the coding format; and
storing the values of the substituted syntax elements with their respective positions within the image as original data, into at least two control objects, each control object corresponding to a specific degradation level of the original image.

3. The method according to claim 2, wherein the image is reconstructed in clear by descrambling the scrambled image by the steps of:
receiving the scrambled image and said control objects;
selecting at least one of the control objects based on a user access condition; and
using said original data, stored in the selected control object(s), for obtaining the reconstructed image by retrieving the respective original values of each substituted syntax element identified by its position.

4. The method according to claim 2, wherein the original data present in the control object corresponding to the higher level of degradation is formed by a subset of the original data present in a control object corresponding to a lower level of degradation.

5. The method according to claim 2, wherein each control object comprises different original data, the selection of the control object according to the user access condition further comprises the selection of the control object(s) corresponding to a higher level of degradation.

6. The method according to claim 2, wherein the coding format is JPEG compression format and said syntax element are DC coefficients and/or AC coefficients or elements of a quantization table.

7. The method according to claim 1, wherein the visual medium is securely uploaded to the distorted visual medium server together with the list of entitled users, said distorted visual medium server applying the distortion effect for creating the distorted visual medium and a plurality of recomposition objects, the distorted visual medium being uploaded to the social network site server and the distorted visual medium identifier being returned to the distorted visual medium server, said distorted visual medium server creating an entitlement object encapsulating the list of entitled users and an identifier of the posting user and storing the plurality of corresponding recomposition objects and entitlement objects together with said distorted visual medium identifier.

8. The method according to claim 7, wherein the recomposition objects are stored by the distorted visual medium server in an encrypted form, the decryption key(s) being stored in the entitlement object.

9. A system for controlling access to a visual medium in a social network comprising user units connectable to a social network site server associated to a database and to a distorted visual medium server storing visual media posted by users of the social network, wherein
the user units comprise a processor, a display, and a client application, the processor being configured to
receive a selection from a posting user of a visual medium to make available to at least one entitled user of said social network;
define a list of entitled users to be entitled to access the visual medium, said list of entitled users comprising at least one identifier identifying at least one entitled user, the at least one identifier being associated to a parameter defining an access level to the selected visual medium;
upload to the distorted visual medium server the visual medium in association with the list of entitled users, said distorted visual medium server storing the visual medium in a memory and applying a distortion effect so as to obtain at least one distorted visual medium degraded according to a predefined degradation level;
receive a request from the at least one entitled user identified in the list of entitled users to download or stream the visual medium;
transmit the request to the distorted visual medium server; and
receive, from the distorted visual medium server, the visual medium distorted according to a degradation level corresponding to the parameter defining the access level associated to the at least one identifier of the at least one entitled user;
wherein the distorted visual medium server is configured to store the original visual medium and to prepare on the basis of the original visual medium one visual medium distorted with a maximal degradation level and a plurality of recomposition objects allowing reconstructing a plurality of degraded visual media from the maximal degraded visual medium according to different degradation levels, each corresponding to an access level attributed to at least one entitled user of the list of entitled users.

10. The system according to claim 9, wherein the distorted visual medium server is configured to distort the visual medium including a digital image by scrambling an original image into a scrambled image by:
receiving the original image having a coding format, said image being divided into successive blocks and being stored in said coding format as a set of syntax elements;
substituting a plurality of said syntax elements by luring syntax elements of the same nature so as to keep the coding format; and
storing the values of the substituted syntax elements with their respective positions within the image as original data, into at least two control objects, each control object corresponding to a specific degradation level of the original image.

11. The system according to claim 10, wherein the distorted visual medium server is configured to reconstruct the image in clear by descrambling the scrambled image by:
receiving the scrambled image and said control objects;
selecting at least one of the control objects based on a user access condition; and
using said original data, stored in the selected control object(s), for obtaining the reconstructed image by retrieving the respective original values of each substituted syntax element identified by its position.

12. The system according to claim 10, wherein the original data present in the control object corresponding to the higher level of degradation is formed by a subset of the original data present in a control object corresponding to a lower level of degradation.

13. The system according to claim 10, wherein each control object comprises different original data, the selection of the control object according to the user access condition further comprises the selection of the control object(s) corresponding to a higher level of degradation.

14. The system according to claim 10, wherein the coding format is JPEG compression format and said syntax element are DC coefficients and/or AC coefficients or elements of a quantization table.

15. The system according to claim 9, wherein the distorted visual medium server is configured to securely receive the uploaded visual medium together with the list of entitled users, to apply the distortion effect for creating the distorted visual medium and a plurality of recomposition objects, the social network site server is configured to receive the uploaded distorted visual medium and to return the distorted visual medium identifier to the distorted visual medium server, said distorted visual medium server being further configured to create an entitlement object encapsulating the list of entitled users and an identifier of the posting user and to store the plurality of corresponding recomposition objects and entitlement objects together with said distorted visual medium identifier.

16. The system according to claim 15, wherein the distorted visual medium server is configured to store the recomposition objects in an encrypted form, the decryption key(s) being stored in the entitlement object.

* * * * *